(No Model.)  3 Sheets—Sheet 1.
G. H. TIETJEN.
STREET OR STATION INDICATOR FOR CARS.
No. 456,098. Patented July 14, 1891.
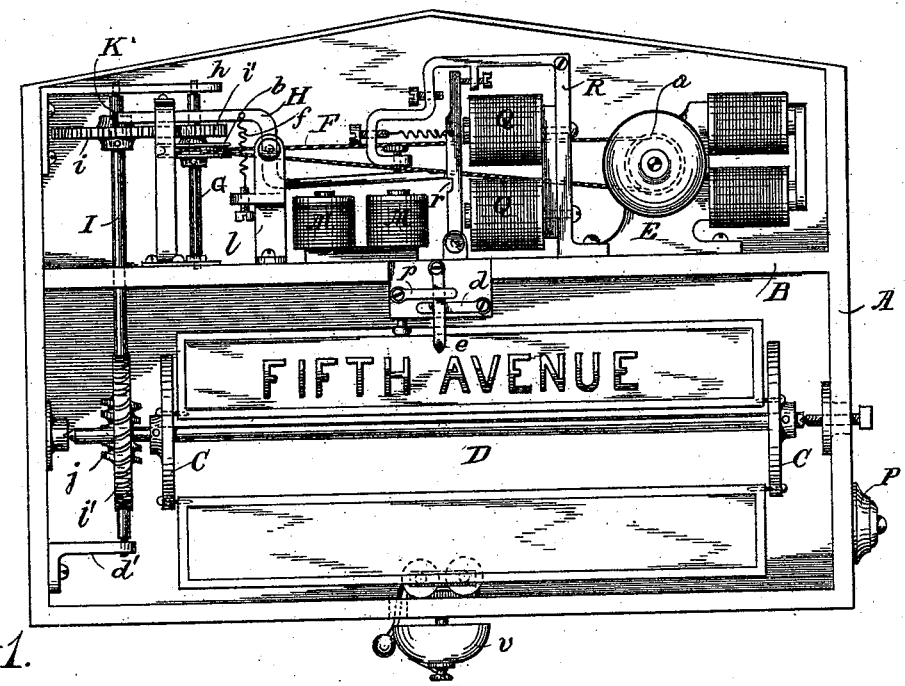
Fig. 1.
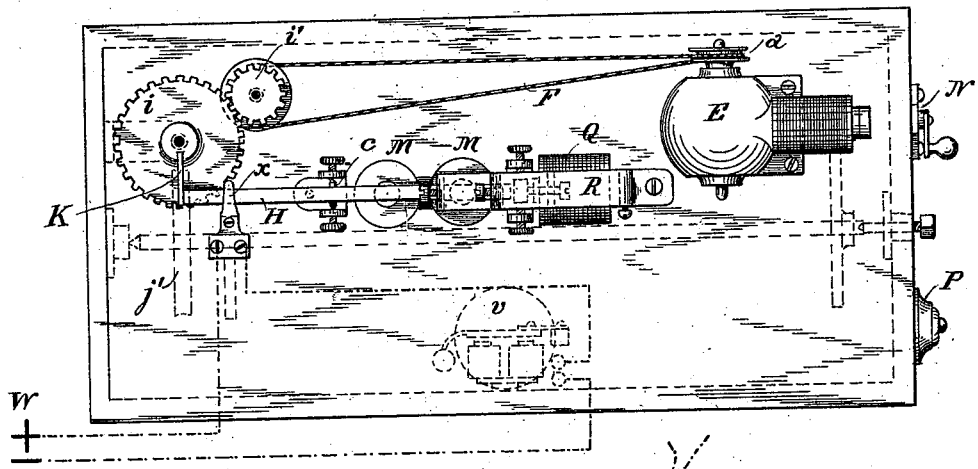
Fig. 2.
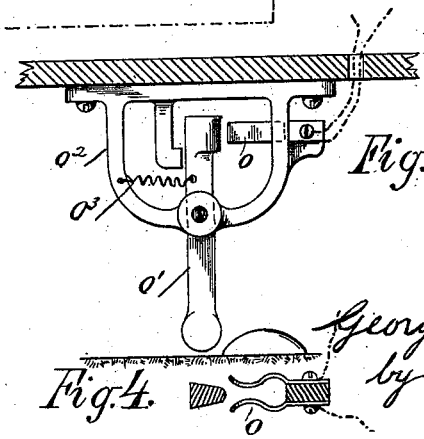
Fig. 3.
Witnesses.
H. Monteverde
M. G. Loefler
Fig. 4.
Inventor
George H. Tietjen
by Jno. L. Boone
att'y (No Model.) 3 Sheets—Sheet 2.
G. H. TIETJEN.
STREET OR STATION INDICATOR FOR CARS.
No. 456,098. Patented July 14, 1891.
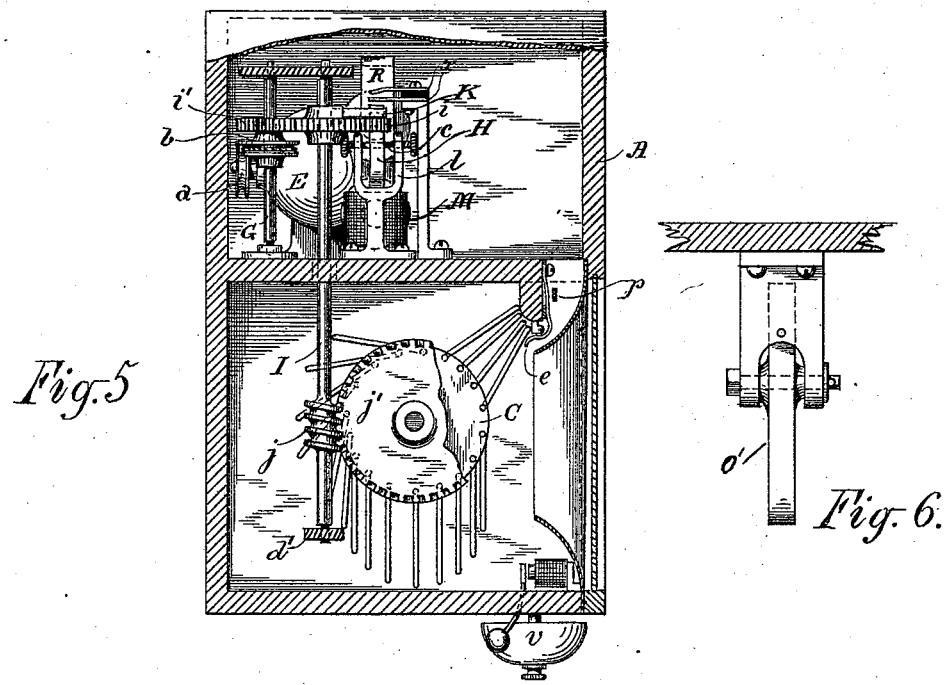
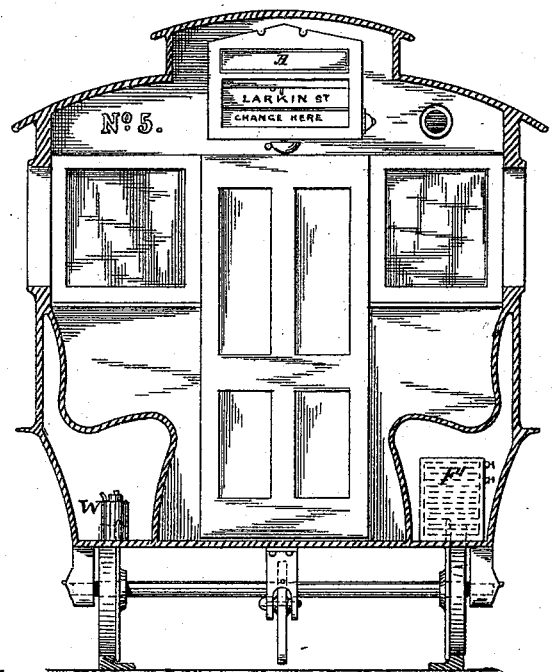
Witnesses.
Inventor
George H. Tietjen (No Model.)  3 Sheets—Sheet 3.

G. H. TIETJEN.
STREET OR STATION INDICATOR FOR CARS.

No. 456,098.  Patented July 14, 1891.

Witnesses.
J. Monteverde
M. G. Loefler

Inventor.
George H. Tietjen
by Jno. L. Boone, atty

UNITED STATES PATENT OFFICE.

GEORGE H. TIETJEN, OF SAN FRANCISCO, CALIFORNIA, ASSIGNOR OF ONE-HALF TO GEORGE H. BAHRS, OF SAME PLACE.

STREET OR STATION INDICATOR FOR CARS.

SPECIFICATION forming part of Letters Patent No. 456,098, dated July 14, 1891.

Application filed January 20, 1890. Serial No. 337,545. (No model.)

*To all whom it may concern:*

Be it known that I, GEORGE H. TIETJEN, a citizen of the United States, residing at San Francisco, in the county of San Francisco and State of California, have invented certain new and useful Improvements in Street or Station Indicators for Cars; and I do hereby declare the following to be a full, clear, and exact description of said invention, such as will enable others skilled in the art to which it most nearly appertains to make, use, and practice the same.

My invention has reference to an improved street or station indicator for street or railway cars; and it has for its object the application of electricity through the medium of suitable mechanical devices by which the current is directed and controlled, whereby the cards on which the names of the streets or stations appear are automatically exhibited at the proper moment.

The main features of my invention are, first, the employment of an electric motor for actuating the mechanism by which the dropping of the cards is effected, and, secondly, an arrangement whereby each falling card is made to stop the motion of the mechanism until the time arrives for another card to be dropped. An electric battery carried on the car supplies the current necessary to actuate the electric motor and operating mechanism, and the circuit is closed to start the mechanism into operation by a projection or obstruction on the track, all as hereinafter more fully described.

Figure 8:
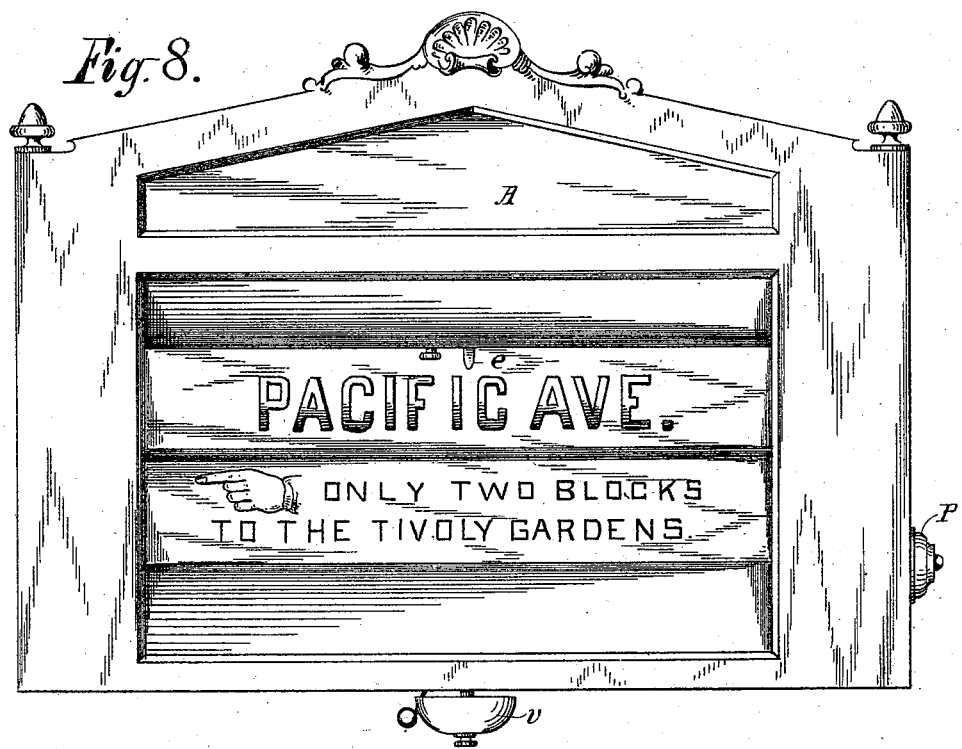

Referring to the accompanying drawings, Figure 1, Sheet 1, is a front view of my indicator with the front of the box or case removed and showing the entire operating mechansim. Fig. 2, Sheet 1, is a top view of the box with cover removed. Fig. 3, Sheet 1, shows a mechanism for closing the electrical circuit by means of an obstruction on the track. Fig. 4, Sheet 1, is a horizontal section through the upper end of the spring-lever and through the spring-arms contiguous thereto. Fig. 5, Sheet 2, is an end view of the box with the end removed. Fig. 6, Sheet 2, is an edge view of Fig. 3, Sheet 1. Fig. 7, Sheet 2, is a transverse section of a car, showing the batteries in place. Fig. 8, Sheet 3, is a front view of the indicator; and Fig. 9, Sheet 3, is a plan showing the battery and its connections with the various parts of the apparatus.

Let A represent a box or cabinet which is adapted to be secured above the door or in some other conspicuous position inside of a car, as shown at Fig. 7. This box or cabinet I divide by a horizontal partition B into an upper and lower compartment.

The cards on which the names of the streets or stations appear are pivoted between the rims of two disks C C, which are carried by a shaft D in the lower compartment of the box, and these cards are arranged to fall one by one from a vertical position above the shaft to a vertical position below the shaft as the shaft is rotated, as shown at Fig. 1, Sheet 1, and Fig. 5, Sheet 2. This feature of my indicator is no part of my invention, as it has been heretofore used in connection with other devices for operating it.

Figure 9:
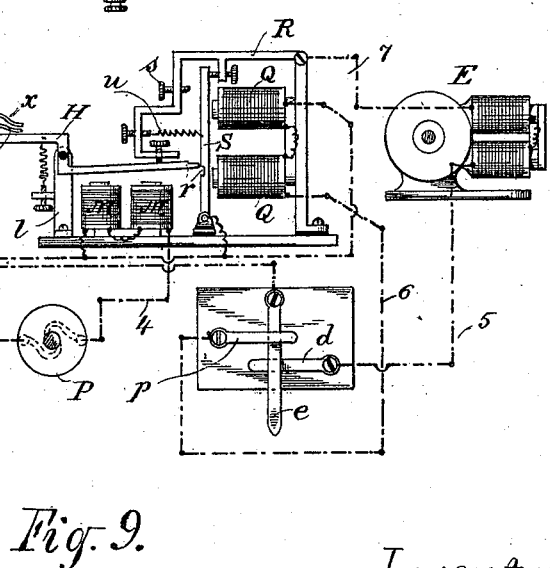

I place the mechanism for operating the indicator in the upper compartment of the box as follows: E is a small electrical motor, which is electrically connected with a battery F' by wires 1 and 2. The wire 2 is led up to the middle of the molding at the top of the front opening in the indicator-box and connects with a metallic spring-plate $e$, Fig. 9. This spring contacts with a metallic plate $d$ underneath it, and the plate $d$ is connected with the motor by wire 5. This spring-plate $e$ extends below the lower edge of the molding, so that it will be struck and forced outward by the weight of the falling card into contact with another plate, hereinafter described. Wire 1 connects with the motor through an upright armature S, hereinafter described, thence through a metallic frame R and wire 7, as shown at Fig. 9. By preference I locate the motor at one end of the box and transmit the power for operating the indicator by means of a belt F; but it might be otherwise located and other means might be used for transmitting the power.

G is an upright shaft which steps in a bearing on the floor of the upper compartment, while its upper end bears in a bracket-arm $h$. On this shaft is a pulley $b$, to which motion and power is transmitted from the pulley $a$ of the electric motor E by the belt F.

I is a vertical shaft which extends from near the bottom of the lower compartment through the partition B and into the upper compartment, being supported at its lower end by a bracket-arm $d'$, and at its upper end in the bracket-arm $h$, before referred to. On this shaft is a spur-wheel $i$, which engages with a spur-wheel $i'$ on the upright shaft G, so that when the shaft G is driven by the belt F from the motor E the vertical shaft I is also driven. A worm $j$ on the shaft I engages with and drives a worm-wheel $j'$ on the horizontal shaft D, which carries the cards, so that the power and motion are transmitted through the mechanism described to cause the card-carrying shaft to rotate.

On the upper face of the spur-wheel $i$ is a rib or brake K, (shown plainly in Fig. 2,) which extends radially from the center to the periphery of the wheel.

H is a bent lever pivoted at $c$ in the upper end of a short standard $l$, and which is drawn downward by a spring $f$, so as to rest upon the face of the wheel $i$ and abut against the rib K, and thus stop its rotation. This lever H is bent so that its opposite end extends above the poles of a pair of electro-magnets M M and acts as an armature, as hereinafter described.

The coils of the magnets M M are connected with battery F' by means of wires 1 and 4, through a switch N, and circuit-closing device O, Fig. 9, which will be described further on. In Fig. 9 I have shown the circuit-closer O, switch N, and a push-button circuit-closer P in this circuit, but in practice the switch and push-button can be dispensed with, their use being to provide a ready means for operating the indicator should it miss a connection or to adjust the cards to a proper position.

Q Q are a pair of electro-magnets secured horizontally on the frame R and connected with battery F' by wires 1 and 6. Wire 6 leads from the magnet to a metallic contact-plate $p$ in the molding above the front opening of the box and just out of contact with spring-plate $e$ before mentioned.

S is an upright pivoted armature standing in front of the poles of the magnets Q Q, and it has a notch $r$ in it in which the tail end of the bent-lever armature of the magnets M M latches when it is drawn down upon the poles of its magnets, and when the armature S is drawn away from the poles of magnets Q Q by the spring $u$. When this armature is drawn away from the poles of the magnets Q Q, it is in contact with a screw $s$ in the frame R and the circuit is closed to the motor, but when it is drawn back by the magnets Q Q the circuit to the motor is broken.

The operation of my indicator will then be as follows: At the point where it is desired to drop a card I secure a metallic projection (shown at Fig. 3, Sheet 1) on the track. The circuit-closer (also shown at Fig. 4) consists of spring-arms O O, which are adapted to be engaged by the upper wedge-shaped end of the spring-lever O', as the lower end of said lever strikes the obstruction upon the track. This lever is pivoted centrally in a frame $O^2$, and is drawn back to its normal position at the proper time by means of a spring $O^3$, thus momentarily closing the circuit which leads to the magnets M M as the car passes over it. This causes the end of the bent lever H, which serves as an armature for these magnets, to be drawn down against its poles and to latch itself in this position in the notch in armature S, and raising the opposite end of the lever above the rib or brake K on the upper face of wheel $i$, thus removing the obstruction to its rotation. Instantly when this obstruction is removed, the circuit to the motor being completed, said motor begins to work. The motion is transmitted from the motor to the mechanism through the belt and gear-wheels to shaft I. The rotation of this shaft causes the worm $j$ and its worm-wheel $j'$ to rotate the horizontal card-carrying shaft D until one of the cards falls from the vertical position above the shaft to the vertical position below the shaft. In falling the upper edge of this card strikes the projecting end of spring-plate $e$ and forces it outward from the metallic plate $d$, thus breaking the circuit to the motor, and forces the spring against the metallic plate $p$, thereby closing the circuit to the magnets Q Q. This causes the latch-armature S to be drawn against the poles of the magnets Q Q and free the bent lever H, which is immediately drawn down by its spring $f$ against the upper face of spur-wheel $i$, so that it abuts against the rib or brake K and stops the movement until the circuit is closed again by the obstruction on the track. This operation is repeated at each street or station, and a card is dropped each time the circuit is closed by the obstruction in the street.

To attract the attention of passengers to the indicator at the time the cards fall, I employ an electric bell $v$, which is connected with and operated by a separate small battery W. The circuit to this bell is closed by the upward movement of lever H, pressing together two springs $x$ $x$, Fig. 9, so that the bell is kept ringing until lever H drops down to stop the movement of wheel $i$.

The mechanism employed in this indicator is quite simple and can be easily contained in a shallow compartment.

Having thus described my invention, what I claim as new, and desire to secure by Letters Patent, is—

1. In a street or station indicator, the combination of a card-carrying shaft, a train of gears, a motor adapted to rotate the shaft through the medium of the gears, a brake or rib extending from the center of one of the gear-wheels to the periphery thereof, a pivoted bent lever adapted normally to engage the rib or brake of the gear, electro-magnets, an electrical circuit connected therewith, and a circuit-closer adapted to complete the electrical circuit and to throw the bent lever out of engagement with the brake, substantially as set forth.

2. In a street or station indicator, the combination of a casing divided into an upper and lower compartment, a horizontal card-carrying shaft in the lower compartment, a worm-wheel upon said shaft, a vertical shaft having its opposite ends mounted in brackets in the upper and lower compartments, said shaft provided on its lower end with a worm which engages the worm-wheel and provided on its upper end with a cog-wheel, and a vertical shaft in the upper compartment provided with a cog-wheel meshing with the cog upon the contiguous vertical shaft and adapted to convey motion thereto through the medium of suitable mechanism, substantially as set forth.

3. In a street or station indicator, the combination of a casing, a card-carrying shaft mounted therein, a plate depending from the casing and forming part of a circuit-breaker, and an electric motor driving said shaft and having electrical connections with the circuit-breaker, the whole arranged to be actuated alternately by the several cards upon the shaft, so as to break the circuit to the motor and stop the rotation of the shaft, substantially as set forth.

4. In a street or station indicator, the combination of a casing, a card-carrying shaft mounted thereon, a battery and motor, a horizontal metallic plate secured to the front of the casing, a wire connecting said plate with the motor, a vertical spring-plate arranged in front of said horizontal plate and contacting therewith, a wire leading from the battery to said last-named plate, a front horizontal spring-plate, an armature, a wire leading from the front spring-plate to said armature, electrical connection between the armature and the motor, and means for actuating the vertical spring-plate so as to alternately contact with the rear and front horizontal spring-plates, substantially as set forth.

5. In a street or station indicator, the combination of a card-carrying shaft, a train of gears, a brake for said gears, an electric motor adapted to rotate said shaft through the gears, a frame or bracket, electro-magnets mounted thereon, a pivoted spring-actuated armature, set-screws for controlling said armature, a battery, electric connection between said battery and the electro-magnets, electric connection with the armature, electric connection between the electro-magnets and armature, and means for alternately making and breaking the circuit between the battery and the magnets and between the latter and the motor, substantially as set forth.

6. In a street or station indicator, the combination of a card-carrying shaft, a train of gears, a brake or rib upon one of said gears, a pivoted bent lever adapted normally to engage the brake or rib, electro-magnets for controlling said lever, a motor adapted to rotate the card-carrying shaft, a frame or bracket, electro-magnets mounted therein, a pivoted spring-actuated armature provided with a notch which the end of the bent lever engages when the latter is drawn by its controlling-magnets, set-screws for limiting the movement of the armature, a battery, electric connection between the battery and the magnets mounted in the bracket, electric connection with the armature, electric connection between the electro-magnets and armature, means for closing the electric circuit and the lever-controlling magnets, whereby said lever is released from the brake or rib and the shaft permitted to turn, and means for subsequently breaking the circuit between the battery and magnets and between the latter and the motor, whereby the rotation of the shaft is prevented, substantially as set forth.

7. In a street or station indicator, the combination of a card-carrying shaft, a train of gears, a stop or brake projecting from said gears, a lever engaging said stop or brake, a bell, a battery therefor, springs $x\,x$, an electric circuit between the battery, bell, and said springs, and electro-magnets adapted to engage said stop and lever, whereby the shaft is allowed to rotate and contact between the lever and springs is secured, so as to sound the bell during the rotation of the shaft, substantially as set forth.

8. A street or station indicator comprising a shaft, cards mounted and fitted to be displayed thereon, gears arranged so as to transmit power from the motor to the driving-shaft, a rotary electric motor adapted to rotate said shaft through the gears and thereby display said cards, an electric circuit adapted to impel said motor, and a circuit-closer adapted to complete said circuit, substantially as set forth.

9. A street or station indicator comprising a shaft, cards mounted thereon and adapted to fall down from a vertical position above to a vertical position below said shaft, an electric motor, a train of gears fitted to transmit motion to the shaft from the motor, a brake acting upon said gears, an electric circuit controlling said brake, a circuit-closer adapted to complete said circuit and thereby remove the brake and allow the rotation of the shaft, and a spring-plate adapted to be forced out by the falling of said cards and thereby break said circuit, apply the brake, and stop said rotation, substantially as and for the purposes set forth.

In witness whereof I have hereunto affixed my signature in the presence of two witnesses.

GEORGE H. TIETJEN.

In presence of—
　GEORGE H. BAHRS,
　A. H. STE MARIE.